United States Patent
Winslow

(10) Patent No.: US 8,316,228 B2
(45) Date of Patent: Nov. 20, 2012

(54) TRUSTED BYPASS FOR SECURE COMMUNICATION

(75) Inventor: Richard Norman Winslow, Wilmington, DE (US)

(73) Assignee: L-3 Communications Corporation, New York, NY (US)

( * ) Notice: Subject to any disclaimer, the term of this patent is extended or adjusted under 35 U.S.C. 154(b) by 828 days.

(21) Appl. No.: 12/337,384

(22) Filed: Dec. 17, 2008

(65) Prior Publication Data
US 2010/0153704 A1    Jun. 17, 2010

(51) Int. Cl.
- G06F 21/00    (2006.01)
- H04L 29/06    (2006.01)
- G06F 12/14    (2006.01)
- G06F 17/00    (2006.01)
- G06F 17/30    (2006.01)

(52) U.S. Cl. ............... 713/153; 713/193; 726/1; 726/5

(58) Field of Classification Search .................... None
See application file for complete search history.

(56) References Cited

U.S. PATENT DOCUMENTS

| | | | |
|---|---|---|---|
| 4,368,357 A * | 1/1983 | Gurak | 380/2 |
| 5,249,230 A | 9/1993 | Mihm, Jr. | |
| 7,483,984 B1 | 1/2009 | Jonker et al. | |
| 2002/0078370 A1* | 6/2002 | Tahan | 713/200 |
| 2004/0246514 A1 | 12/2004 | Clough et al. | |
| 2007/0133762 A1 | 6/2007 | Berkman | |
| 2008/0060065 A1 | 3/2008 | Wynn et al. | |
| 2008/0235759 A1* | 9/2008 | McCarty | 726/1 |
| 2009/0083548 A1* | 3/2009 | Dettinger et al. | 713/193 |
| 2009/0217358 A1* | 8/2009 | Kumar et al. | 726/5 |
| 2010/0154028 A1* | 6/2010 | Wainner et al. | 726/1 |

FOREIGN PATENT DOCUMENTS
EP    1 580 934 A2    9/2005

OTHER PUBLICATIONS

Capulli, J. et al., "Muos Communications Infrastructure Demonstration Network and Encryption-based Applications" Military Communications Conference, 2005, MILCOM 2005. IEEE Atlantic City, NJ, USA Oct. 17-20, 2005, Piscataway, NJ, pp. 1-5, XP010901642.

Hawk, J., "Wireless Warriors Secure in their Knowledge", Signal Magazine, 2005, http://www.afcea.org, 4 pages.

Harrris Assured Communications, "Secure Wireless Local Area Network", SecNet Plus PC Card, 2006, 2 pages.

* cited by examiner

*Primary Examiner* — Shin-Hon Chen
(74) *Attorney, Agent, or Firm* — Condo Roccia LLP

(57) ABSTRACT

A device having an encryption module in communication with first and second communication ports may facilitate connecting to an access network, without requiring a non-secure hard drive to initiate the network access. The encryption module may define a normal mode and a bypass mode. In normal mode, data from the first port may be sent encrypted to the second port, for communicating securely in an encrypted environment. In bypass mode, data from the first port may be sent unencrypted to the second port. The data being sent may be intercepted and presented to the user for approval in a human readable format. The user may confirm that the data is appropriate for being sent unencrypted. This data may be sent unencrypted in response to a request for information (e.g., an assent to terms and conditions) from the access network, such as at a hotel or public wireless hotspot, for example.

21 Claims, 7 Drawing Sheets

TRUSTED BYPASS FOR SECURE COMMUNICATION

GOVERNMENT SUPPORT

The present invention was supported by the National Security Agency under Contract Numbers MDA-904-02-C-1152 and CCEP-056-04. The government may have certain rights in the invention.

BACKGROUND

Network access providers often present terms and conditions that a user must accept prior to gaining access to a network. For example, a user may wish to connect to a Wireless Fidelity (Wi-Fi) hot spot or an Ethernet access point. Initially the user may request a webpage via Hyper Text Transport Protocol (HTTP). Instead of providing the requested webpage, the network access provider may respond with a "terms and conditions" webpage that presents the requirements for accessing the network. The requirements may include clicking a checkbox that indicates that the user agrees to the terms and conditions and clicking a submit button to send the data to the network access provider. The requirement may include payment of a service fee or provision of a username/password combination. Once the user has satisfied the requirements, the network access provider may allow subsequent access to the network.

This process presents a problem to users that wish to access a virtual private network (VPN) via the network access provider. The VPN may follow a security policy that does not allow for the initial insecure transaction with the network service provider. For example, the user's VPN software or hardware may not allow the transfer of the unencrypted data necessary to meet the requirements of the terms and conditions.

For example, the user's device may be a Type 1 product. A Type 1 product may include cryptographic equipment, assemblies or components classified or certified by the National Security Agency (NSA) for encrypting and decrypting classified and sensitive national security information. Generally, Type 1 products may be used to protect systems requiring the most stringent protection mechanisms. To securely accept the terms and conditions, the user may have to first boot with an unclassified hard drive, accept the terms and conditions, shutdown the device, and then reboot with the classified hard drive to connect to the VPN. This cumbersome technique is inefficient because it requires booting the device more than once and physically swapping computer hardware. Moreover, the technique may be completely ineffective if the user does not have the unclassified hard drive available.

SUMMARY

The device, disclosed herein, may facilitate efficient and secure network access. This approach may enable network access with a secure hard drive and/or laptop, without requiring a non-secure hard drive and/or laptop to initiate the network access.

The device may include an encryption module in communication with a first port and a second port. The encryption module may be a Type 1 encryption module. The encryption module may define a first mode (e.g., normal mode) and a second mode (e.g., bypass mode). In the first mode, data from the first port may be sent encrypted to the second port. Thus, in the first mode the device may communicate securely in an encrypted environment.

In the second mode, data from the first port may be sent unencrypted to the second port. The data being sent may be intercepted and presented to the user for approval. The presented data may be converted to a human readable format. The presented data may be shown without hidden characters and/or data fields. Accordingly, the user may be confident that the data being displayed is what will be sent unencrypted. The user may confirm that the data is appropriate for being sent unencrypted (e.g., that no sensitive information is improperly included in the data). The user may approve or decline the presented data.

Thus, the second mode may facilitate connectivity to an access network, such as a wireless network access point for example. To illustrate, the user may place the encryption module into the bypass mode. The encryption module may initiate a dummy Hyper Text Transfer Protocol (HTTP) session. Data indicative of a request for assent to conditions for network access may pass from an access network via the second port to the first port. In response, the user may consider the conditions and/or indicate assent. For example, the user may enter information, select an option, click a "submit" or "accept" button, and/or the like. Data associated with the user's indication may made be made ready to be sent to the access network. The encryption module may intercept the data and present it to the user. If the user approves, the data may be sent unencrypted, a record of the transaction may be logged, and/or the transaction may result in network connectivity with the access network. The user may place the device into a normal mode, in which data may be encrypted for secure communication.

DETAILED DESCRIPTION

Figure 1:
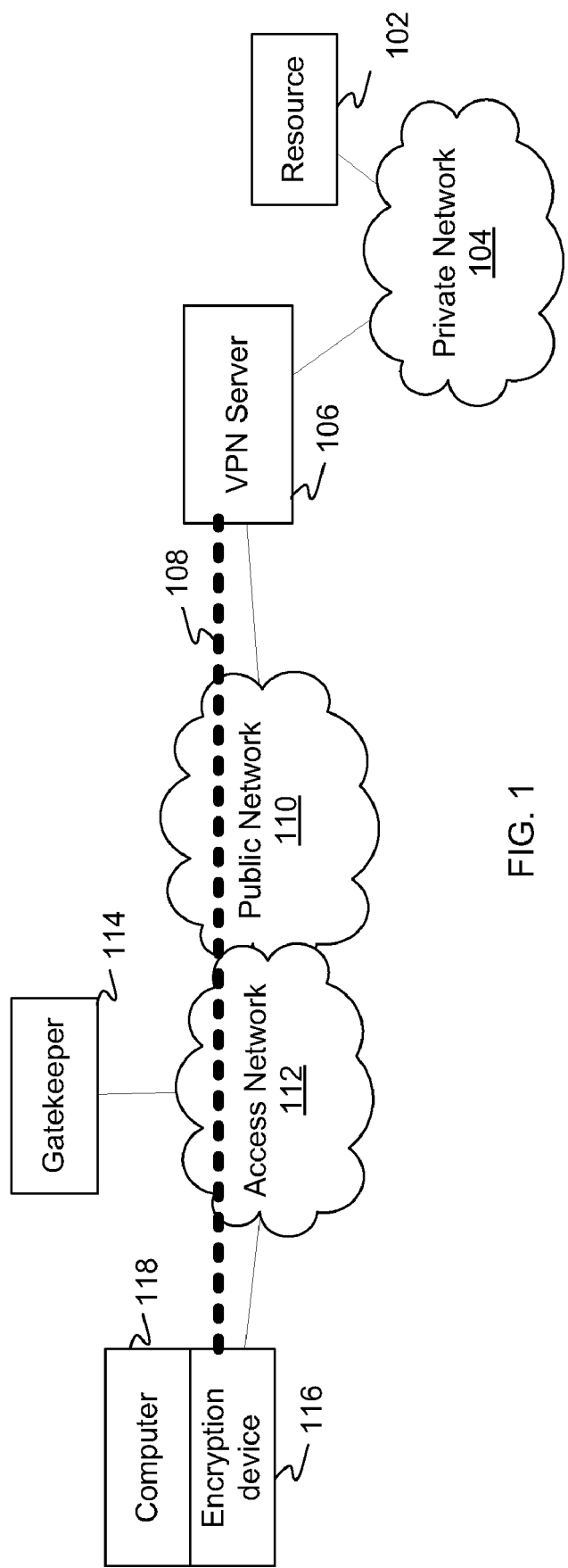
FIG. 1 depicts an example operating environment.

FIG. 1 depicts an example operating environment. A user or application of a computer 118 may wish to access a resource 102 located on a private network 104 via a virtual private network (VPN) 108. The resource 102 may be any information system for the collection, storage, processing, maintenance, use, sharing, dissemination, disposition, display, or transmission of information. For example, the resource 102 may include a database, an intranet web-server, an application server, a network hard-drive, a storage area network (SAN), an e-mail server, and/or the like.

The resource 102 may be in communication with the private network 104. The private network 104 may be a local area network (LAN), a metropolitan area network (MAN), a wide area network (WAN), a wireless LAN (WLAN), and/or the like. Access to and use of the private network 104 may be restricted to authorized users. For example, the private network 104 may be administered by a private organization or a public entity, such as a government agency. Also for example, the private network 104 may support the transfer of classified or sensitive information.

A VPN server 106 may be in communication with the private network 104. The VPN server 106 may provide a gateway between the VPN 108 and the private network 104. The VPN server 106 may be in communication with a public network 110. The public network 110 may be any system, subsystem, or component suitable for transferring data. The public network 110 may be the internet, core network service provider, wide area network, and/or the like. The VPN server 106 may include security policies that may define the characteristics of the VPN 108. The VPN server 106 may be in communication with a encryption device 116 to establish the VPN 108.

The VPN 108 may be a secure connection established between an encryption device 116 and the VPN server 106. The VPN 108 may enable secure communication between the computer 118 and the resource 102. In one embodiment, the VPN 108 may define a information systems link utilizing tunneling, security controls, and endpoint address translation that may give the impression of a dedicated line. In one embodiment, the VPN 108 may use security protocols to provide confidentiality, authentication, and data integrity. For example, the security protocols may include IP security (IPsec) protocol, Secure Sockets Layer Transport Layer Security (SSL/TLS), OpenVPN, Point-to-point tunneling protocol (PPTP), High Assurance Internet Protocol Encryptor (HAIPE), Internet Security Association and Key Management Protocol/Internet Key Exchange (ISAKMP/IKE) and the like. The security protocol may include tunneling that encapsulates the data communicated between the VPN server 106 and the encryption device 116.

The encryption device 116 may access the public network 110 via an access network 112. The access network 112 may provide communications between the Encryption device 116 and the public network 110 for communications to the VPN server 106. Like the public network 110, the access network 112 may be any system, subsystem, or component suitable for transferring data. For example, the access network 112 may be wired or wireless. The access network 112 may be a LAN, MAN, WAN, WLAN, Global System for Mobile Communications (GSM), personal area network (PAN), dial-up modem access, and the like. The access network 112 may employ network technologies such as Ethernet, WiFi, Bluetooth, and the like. The access network 112 may be administered by an administrator. For example, the access network 112 may be administered by a hotel, a business center, an airport, a public library, a network service provider, a coffee shop, and/or the like.

The administrator may define an access policy related to the access network 112. The access policy may include one or more conditions for access. The conditions for access may require that a user of the access network 112 assent to legal terms and conditions. For example, the legal terms and conditions may provide a description of the network access service to be provided; general use restrictions, details about charges, billing, and payment; a statement of the operational limits of the service; a statement regarding registration, customer information, and password security; a third-party content disclaimer; a disclaimer of warranties; a statement of limited liability; a statement concerning local laws and export controls, contractual clauses such as choice of law, force majeure, and severability; an acceptable use policy; a statement regarding trademarks; digital millennium copyright notices; contact information; and/or the like.

The conditions for access may require that the user create an account with the administrator and provide payment for use of the access network 112. For example, the conditions may require a username/password combination that corresponds to an existing account. Also for example, the conditions may require a form of payment such as a credit card account, deposit account, escrow account, and the like. Also for example, the conditions may require some identification or demographic information from the user, such as a name, address, room number, birth date, e-mail address, and the like.

The access policy may be enforced by a gatekeeper 114. The gatekeeper 114 may grant or deny the availability of the access network 112 to a user in accordance with the access policy. The gatekeeper 114 may be a computer, server, router, network appliance, and the like. The gatekeeper 114 may provide authorization and network access functions associated with the access network 112. The gatekeeper 114 may include a web server that redirects an initial Hyper Text Transport Protocol (HTTP) request from the computer 118. The gatekeeper 114 may provide an entry webpage that presents the conditions for access. Once the user has satisfied the conditions, the gatekeeper 114 may allow use of the access network 112.

To illustrate, the user of the computer 118 may be in a hotel and may wish to use the LAN owned and administered by the hotel to establish a VPN 108 between the Encryption device 116 and the VPN server 106. When the user connects to the hotel's LAN, the gatekeeper 114 may present the user with a webpage that includes the hotel's terms and conditions of use associated with the access to public network 110 via access network 112. The user may assent to these terms and conditions before being granted access to the public network 110 via access network 112. For example, the user may submit a form in connection with the webpage to the gatekeeper 114. The gatekeeper 114 may determine that the user's submission satisfies the conditions and may allow the computer 118 to communicate with the access network 112. Via the access network 112, the encryption device 116 may establish a VPN 108 between the encryption device 116 and the VPN server 106.

Figure 2:
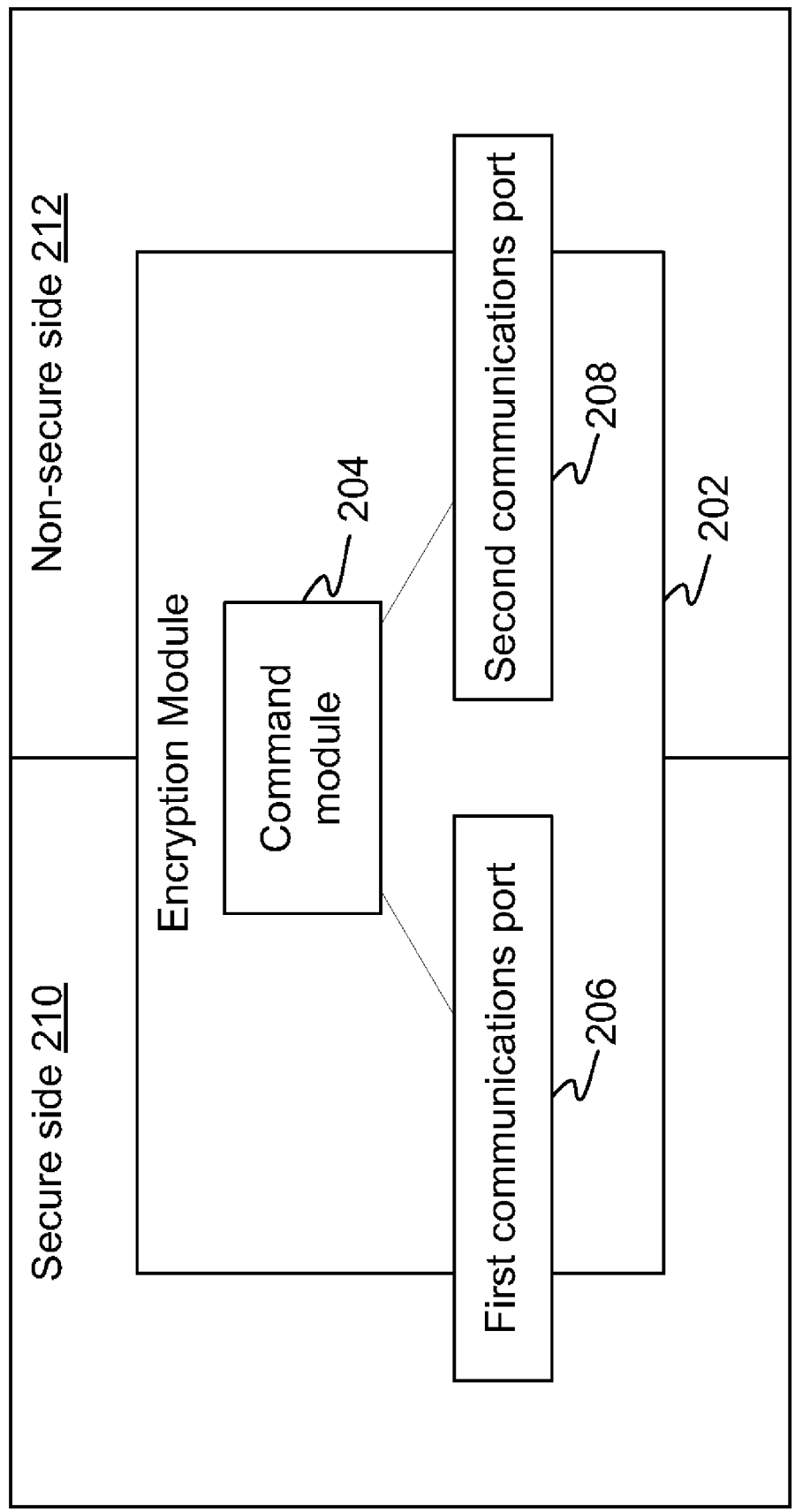
FIG. 2 is a block diagram of an example encryption device.

FIG. 2 is a block diagram of an example encryption device 202. The encryption device 202 may define a demarcation between a secure side 210 and a non-secure side 212. The encryption device 202 may include a first communications port 206 and a second communications port 208. The first communications port 206 may be in communication with a encryption module 204, and the second communications port 208 may be in communication with the encryption module 204. The first communications port 206 may be associated with a secure side 210 of the encryption device 202, and the second communications port 208 may be associated with the non-secure side 212 of the encryption device 202.

In a classified environment, the secure side 210 may be may be known as the red side, and the non-secure side 212 may be known as the black side. The red designation may apply to systems, devices, areas, circuits, components, equipment, and the like in which unencrypted national security information is being processed. The black designation may apply to systems, devices, areas, circuits, components, equipment, and the like in which national security information is encrypted or is not processed.

Generally, user data originating on the secure side 210 of the encryption device 202 may pass to the non-secure side 212 in an encrypted form. Encrypted and unencrypted user data originating on the non-secure side 212 of the encryption device 202 may pass to the secure side 210 of the encryption device 202. Thus, the information stored in connection with the computer's operating system (i.e., in communication with the secure side 210, See FIG. 3) may be prevented from disclosure in an unencrypted form.

When assenting to terms and conditions presented by the gatekeeper 114, the encryption module 204 may pass the unencrypted data relating to the terms and conditions from the second communications port 208 to the first communications port 206. The encryption module 204 may define a normal mode and a bypass mode. In the normal mode, user data from the first communications port 206 may be encrypted and sent to the second communications port 208. The normal mode may represent typical operation of the encryption device 202. The normal mode may provide secure communications of encrypted data over a VPN 108. In bypass mode, user data from the first communications port 206 may be unencrypted and sent to the second communications port 208. The bypass mode may provide limited unencrypted communications. The bypass mode may be used to facilitate reviewing and/or responding to conditions for network access.

When the VPN 108 connection is established between the encryption device 202 and the VPN server 106, information associated with the secure side 210 may pass through the encryption device 202, via the VPN 108, to the VPN server 106. Encrypted data may pass from the secure side 210 to the non-secure side 212 via the encryption device 202. Likewise, unencrypted data originating at or behind the VPN server 106 may pass via the VPN 108 and the encryption device 202 from the non-secure side 212 to the secure side 210.

Figure 3:
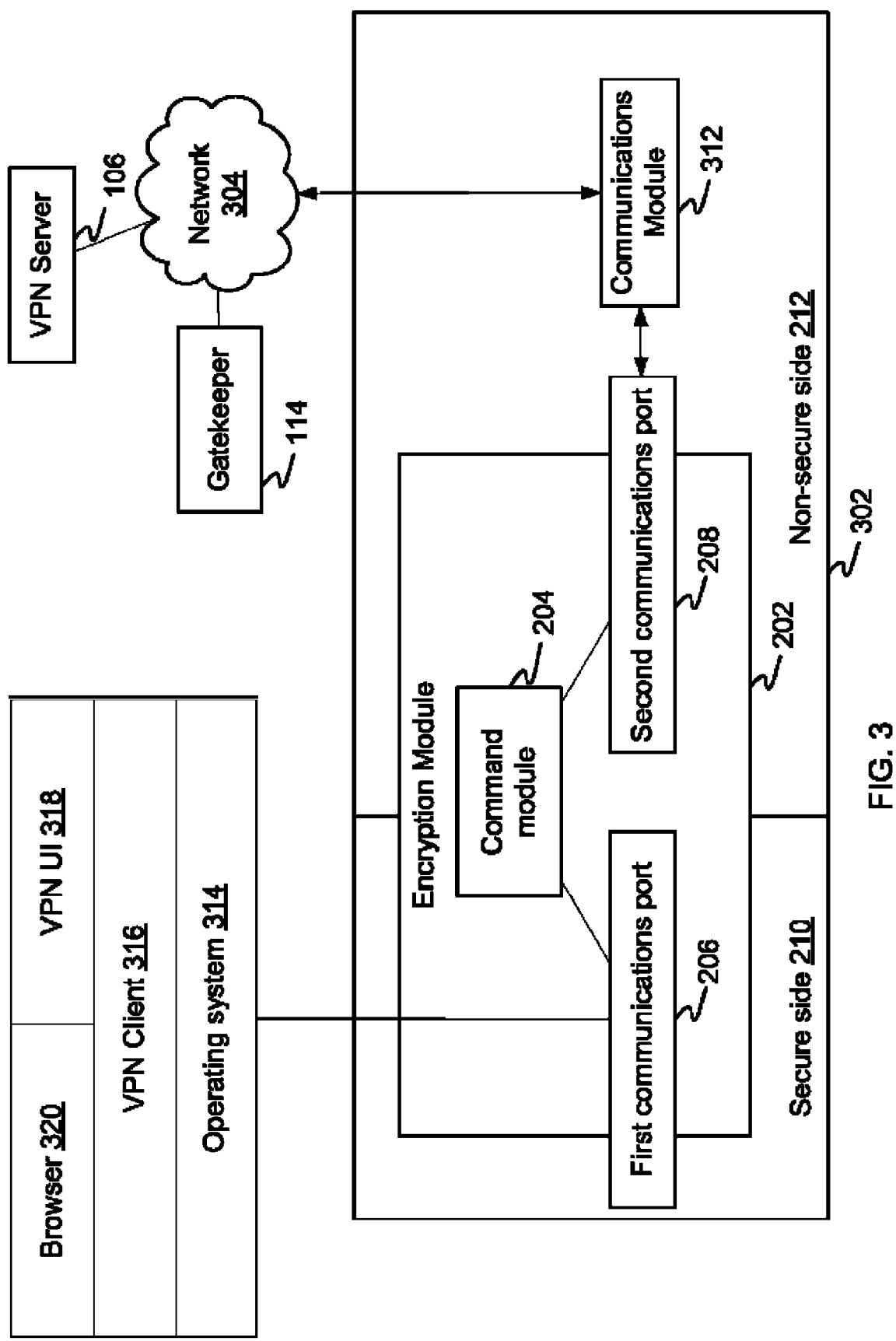
FIG. 3 is a block diagram of an example device for accepting conditions of network access.

FIG. 3 is a block diagram of an example device 302 for accepting conditions for access to a network 304. The device 302 may establish a VPN 108 between the device 302 and the VPN server 106 through one or more networks. The device 302 may be implemented in hardware and/or software connectable to a user's computer 118. For example, the user may have a computer 118 and the device 302 may be a Personal Computer Memory Card International Association (PCM-CIA) device 302, Bluetooth device, universal serial bus (USB) device 302, and the like.

The encryption device 202 may define a demarcation between a secure side 210 and a non-secure side 212 of the device 302. The encryption device 202 may be any component, system, or subsystem suitable for enforcing data transfer rules and establishing a secure connection with the VPN server 106. The device may include one or more processors for handling logic and data manipulation. The processors may be microprocessors, digital signal processors, application-specific integrated circuits, and the like. For example, the encryption device 202 may implement an IP Sec connection with the VPN server 106. Also for example, the encryption device 202 may be a Type 1 encryption device. The encryption device 202 may generate keys used to encrypt data sent between the encryption device 202 and the VPN server 106. When establishing a VPN 108 between the device 302 and the VPN server 106, the encryption device 202 may coordinate the VPN 108 with the VPN server 106 via the second processor 308, the communications module 312, and the network 304.

The device 302 may include a communications module 312 to provide data communications between the device 302 and the network 304. The communications module 312 may include an IEEE 802.11x Wireless adapter, an Ethernet adapter, a Bluetooth adapter, a modem, a mobile wireless adapter, and the like.

The device 302 may include a datastore (not shown) in communication with the encryption module 306. The datastore may be any component, system, or subsystem suitable for storing data. In one embodiment, the datastore may be volatile memory such as random access memory (RAM). In one embodiment, the datastore may be nonvolatile memory, such as read-only memory (ROM), flash memory, magnetic storage, and the like. The datastore may have stored therein computer executable instructions to direct the operation of the encryption module as disclosed herein.

The device 302 may communicate with a computer operating system 314. The operating system 314 may include a secure mode and a non-secure mode. For example, when the computer 118 is booted with a classified hard drive, the operating system 314 may be in a secure mode. When the computer 118 is booted with an unclassified hard drive, the operating system 314 may be in a non-secure mode.

The operating system may provide a platform for a VPN client 316. The VPN client 316 may serve as an endpoint in a VPN connection. The VPN client 316 may include secure communications protocol functions. The VPN client 316 may provide an interface to other applications running on the computer. The interface may include an interface to a secure communications channel. The VPN client 316 may include one or more configurable settings associated with the secure channel.

The VPN client 316 may include a VPN user interface 318 (UI). The VPN UI 318 may include a graphical user interface, a command-like interface, and/or both. The VPN UI 318 may server to present information to the user and to receive data from the user. For example, the VPN UI 318 may present data to the user indicative of an intercepted message being sent unencrypted from the secure side 210 to the non-secure side 212.

The VPN client 316 may provide an platform interface for the browser 320. The browser 320 may include a software application suitable for navigating the world wide web. For example, the browser may include software for displaying internet pages, for interacting with user forms, JAVA, scripts, and the like, and for sending information and/or requests to web.

Figure 4:
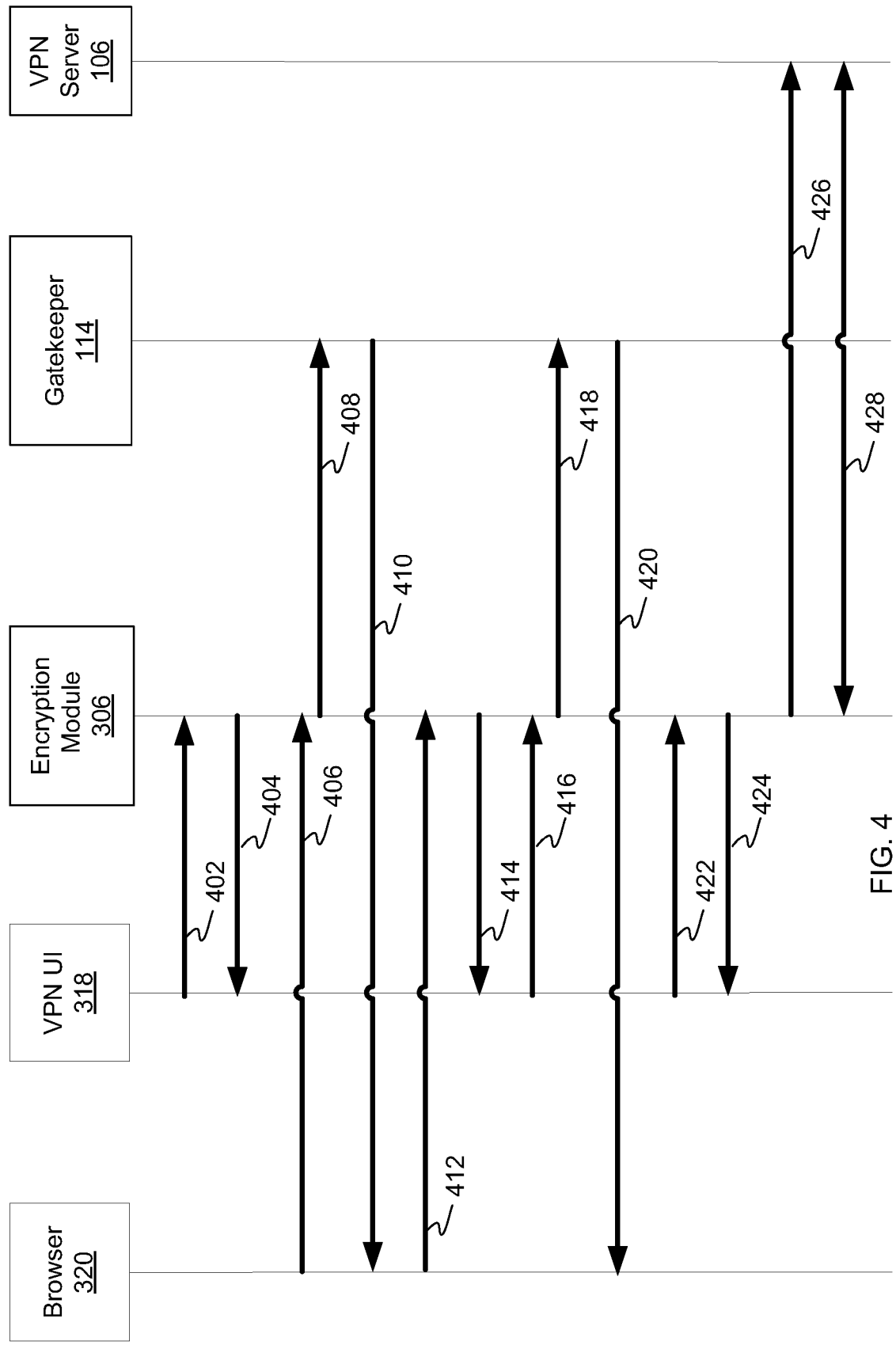
FIG. 4 is a protocol flow diagram of an example method for accepting conditions of network access.

FIG. 4 is a protocol flow diagram of an example method for accepting conditions of network access. A user may indicate via the VPN UI 318 that the user intends to enter a bypass mode. For example, the user may click a menu option or enter a command-line command. At 402, an indication that the user intends to enter bypass mode may be sent from the VPN UI 318 to the encryption module 306. For example, the VPN UI 318 may communicate via a driver application programming interface (API) to the encryption module 306.

The encryption module 306 may process the request to enter bypass mode. One or more limitations may be placed on entry into bypass mode. For example, a limit on the number of bypass mode entries, such as that in a 24-hour period for example, may be set. For example, limit on the overall duration of time in bypass mode, such as that in a 24-hour period for example, may be set. To illustrate, the encryption module may limit bypass mode to a three minute duration. For example, a limit on the number of messages associated with the bypass mode may be set. For example, a limit on overall byte volume in bypass mode may be set. For example, a limit on the number of HTTP messages may be set. If it is determined that the limit on bypass mode use has been met, the request to enter bypass mode may be denied.

Bypass mode limitation processing may be done by the encryption module and/or a processor of the computer 118. This processing may be directed by software, firmware, or the like associated with the encryption module. This processing may be directed by software, such as a driver, running on the computer 118. The software may be associated with the Encryption device 116.

At 404, the encryption module 306 may respond to the VPN UI 318. The encryption module 306 may place the device into bypass mode. The encryption module 306 may indicate to the VPN UI 318 that the device is in bypass mode.

The user may open a browser 320. At 406, the browser may initiate an initial a Hyper Text Transport Protocol (HTTP) request. The initial HTTP request may be a website defined as the browser's start page. For example, the browser may have a start page configured and may request that start page when the browser 320 is opened. The initial request may include a request made responsive to an action by the user, such as clicking a link, typing a Uniform Resource Locator (URL), and/or the like.

The encryption module 306 may intercept the initial HTTP request and launch a dummy request, at 408. The dummy request may include an HTTP request to a website and/or search engine. The HTTP request may be made to a popular website. The encryption module 306 may store the dummy HTTP request locally on a non-secure side of the encryption module 306. The encryption module 306 may cycle through one or more dummy requests, such that the dummy request itself is not a signature of a connection from the encryption module 306.

The dummy request may return the intended webpage, which may be passed to the browser 320. The appearance of the intended webpage may indicate connectivity to the access network, and the user may terminate the bypass mode.

The dummy request may return data associated with the gatekeeper 114. For example, the gatekeeper 114 may intercept the dummy HTTP request. At 410, the gatekeeper 114 may respond with a request for assent to conditions for network access. For example, the request from the gatekeeper 114 may include use restrictions, legal requirements, a request for information, such as username, username/password, room number, student code, and/or the like. The request from the gatekeeper 114 may require that the user check an "accept" checkbox and/or click a "submit" button.

The request from the gatekeeper 114 may pass via the encryption module 306 from the non-secure side 212 to the secure side 210 and to the browser 320. The browser may present the request to the user, and the user may interact with the request as appropriate to establish to assent to the conditions for network access. If the user disagrees with the conditions for network access, the user may close the browser and terminate bypass mode.

If the user decides to assent to the conditions for network access, such as by clicking an accept button displayed in the browser 320, a response may be sent, at 412. The response may include information indicating assent to the conditions for network access.

This response may be an HTTP response, a JAVA-based communication, a middleware communication (using simple object access protocol (SOAP), for example), or the like. The response may include information embedded in the response that corresponds to the information provided by the user in response to the gatekeeper 114. For example, the response may include an HTTP GET message with data encoded in a Uniform Resource Identifier (URI). The response may include an HTTP POST message with data encoded in the body of the message.

The encryption module 306 may intercept the response. The encryption module 306, in bypass mode, may intercept any unencrypted data being sent from the secure side 210 to the non-secure side 212.

At 414, the encryption module 306 may present intercepted response to the VPN UI 318 for inspection by the user. This presentation may enable the user to check that the information being sent unencrypted from the secure side 212 to the non-secure side is suitable for being sent unencrypted. For example, the user may confirm that no sensitive information has been improperly included in the response to the gatekeeper 114. The VPN UI 318 may display a pop-up window to the user including the presentation of the data being sent from the browser to the gatekeeper.

The information may be converted to a human-readable format. For example, the information may be converted to display any hidden data to the user. Printable American Standard Code for Information Interchange (ASCII) characters may be displayed as ASCII characters. Linefeeds and carriage returns may be applied to the data for proper formatting. Printable hexadecimal encoded characters may be displayed as ASCII characters. Nonprintable hexadecimal encoded characters may be displayed as character names (for example control, alt, escape, and the like). Further, the conversion may support extensions to ASCII such as ISO 8859, UTF-8, Unicode, Multi-Byte encodings, and the like.

The information may include a identifier associated with the intended destination of the information. For example, the identifier may include an Internet Protocol (IP) address. To illustrate, the IP address of the gatekeeper 114 may be presented. The IP address may be accompanied by a reverse Domain Name Server (DNS) look-up, to provide additional information about the intended recipient.

The information may be presented with a request for approval and/or disapproval. The user may approve or disapprove that the data be sent unencrypted. For example, the human user may analyze the presented data for any sensitive information.

The user may approve the message, and an indication of the approval may be sent from the VPN UI 318 to the encryption module 306, at 416. At 418, the encryption module 306 may forward the response to the gatekeeper as formatted by the browser 320 to the gatekeeper 114. The message at 418 may serve as a response to the gatekeeper's request at 410.

The gatekeeper 114 may analyze the response which includes the user's assent to the conditions for network access. The response may be approved by the gatekeeper. The gatekeeper may send a response indicating that approval at 420. The gatekeeper may allow network access and enable network connectivity.

The response may require follow-up information. For example, the response may be part of a multi-page set of conditions for network access. The gatekeeper 114 may send a subsequent part to the initial network access transaction, and the process at 410 through 418 may repeat. The response may be disapproved by the gatekeeper 114. The gatekeeper 114 may indicate the disapproval in a message to the browser 320.

The user may respond to a follow-on request or a disapproval. The encryption module 306 may again check that one or more limitations associated with the bypass mode have not yet been met before allowing any subsequent interaction.

At 422, the user may terminate the bypass mode and enter normal mode. The user may indicate the mode change via the VPN UI 318 to the encryption module 306. At 424, the encryption module 306 may respond to the VPN UI indicating that the bypass mode has been terminated and/or that the encryption module 306 is in normal mode. In normal mode, unencrypted data from the secure side 210 to the non-secure side 212 may be blocked by the encryption module 306.

At 426, the encryption module 306 may send a request to the VPN server 106. Conditions for network access have been met, so the gatekeeper may allow connectivity between the encryption module 306 and the VPN server 106. The VPN server 106 may respond to the request as appropriate and may establish secure communications, at 428. The secure communications, at 428, may include an encrypted VPN channel between the encryption module 306 and the VPN server 106. The browser 320 or other applications on the computer 118 may communicate securely via the encryption module 306 and the VPN server 106.

Figure 5:
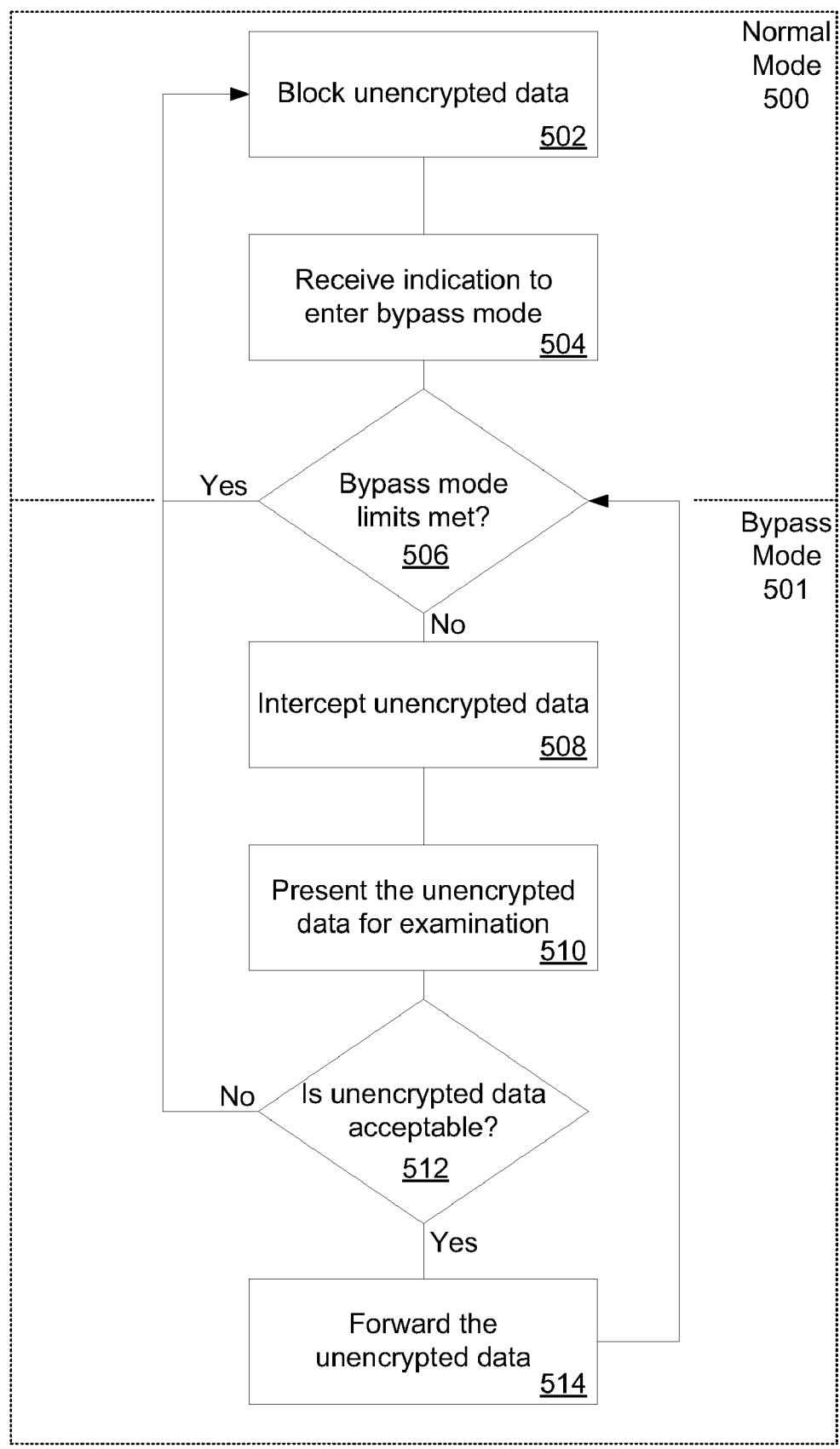
FIG. 5 is a process flow diagram of an example method for accepting conditions of network access.

FIG. 5 is a process flow diagram of an example method for accepting conditions of network access. The process may include two modes, a normal mode 500 and a bypass mode 501. In normal mode 500, unencrypted data being sent from a secure environment to a non-secure environment may be blocked. The normal mode 500 may require that such data be encrypted. Bypass mode 501, may enable limited unencrypted communications from the secure environment to the non-secure environment. The bypass mode may include limitations on the magnitude of its use and may impose additional user actions to approve the data being sent.

At 502, unencrypted data may be blocked. For example, unencrypted data may be blocked from traversing from a secure environment to a non-secure environment. At 504, an indication from a user may be received to enter bypass mode. The indication may include an indication from a user interface, such as a graphical user interface (UI) and/or a command-line interface (CLI). For example, the user may click a graphical menu option indicating entry into bypass mode.

At 506, this request may be considered in light of bypass mode limitations. If the bypass mode limits have already been met and/or exceeded, the process may continue to block unencrypted data at 502. If the bypass mode limits have not yet been met, the process may proceed to intercept any unencrypted data being sent from the secure environment to the non-secure environment, as 508. The unencrypted data may include a response indicative of an assent to conditions for network access.

At 510, when the data is intercepted, it may be presented for examination. For example, it may be presented in a pop-up window to the user. It may be converted to a human-readable format. For example, hidden data may be presented in a human-readable format.

The user may consider the presented data to determine whether the unencrypted data is acceptable for being sent from the secure environment to the non-secure environment. Computer checks of the data may be conducted. For example, the computer may check the data to determine if there are any binary file formats embedded in the body of the message.

The user may be presented with the option to approve or disapprove the data, at 512. If the unencrypted data is not acceptable, the user may so indicate and the process may revert to normal mode 500, at 502 in which unencrypted data is blocked. If the user indicates that the unencrypted data is acceptable, the unencrypted data may be forwarded to its destination, at 514. For example, the unencrypted data may be acceptable because it may include information to assent to the conditions for network access within limits assumed by the user to be suitable for being sent unencrypted. The unencrypted data may be acceptable because it may not include sensitive information that the user may not wish to be passed in an unencrypted form in the non-secure environment.

Having sent data in bypass mode, the process may proceed to again check the bypass limits. The status of the bypass limits may enable subsequent bypass mode 501 communications. The status of the bypass limits may cause the process to terminate bypass mode 501 and enter normal mode 500. Although not shown, the user may terminate bypass mode 501 and revert to normal mode 500 at anytime.

The process may include a parallel logging function. The logging function may record activity associated with normal mode 500 and bypass mode 501 operation. For example, the logging function may provide a secure audit record, associated with the user of bypass mode 501. For example, information associated with each bypass mode operation may be logged and encrypted locally. When a connection is available, this data may be sent to a central server with data indicating the identity and circumstances of the user when the bypass mode 501 was used. This data warehouse may be analyzed for signatures of misuse. Possible indications of misuse may be probed further to provide an additional layer of security.

Logged information may include the time, date, nature of transaction, one or more Internet Protocol addresses associated with the transaction, a copy of the data received from the non-secure environment, a copy of the data to be sent to the non-secure environment, information associated with one or more recent keystroke entries, user identifier, a memory and/or core dump, a process and/or task list associated with the computer, and/or the like.

Figure 6A:
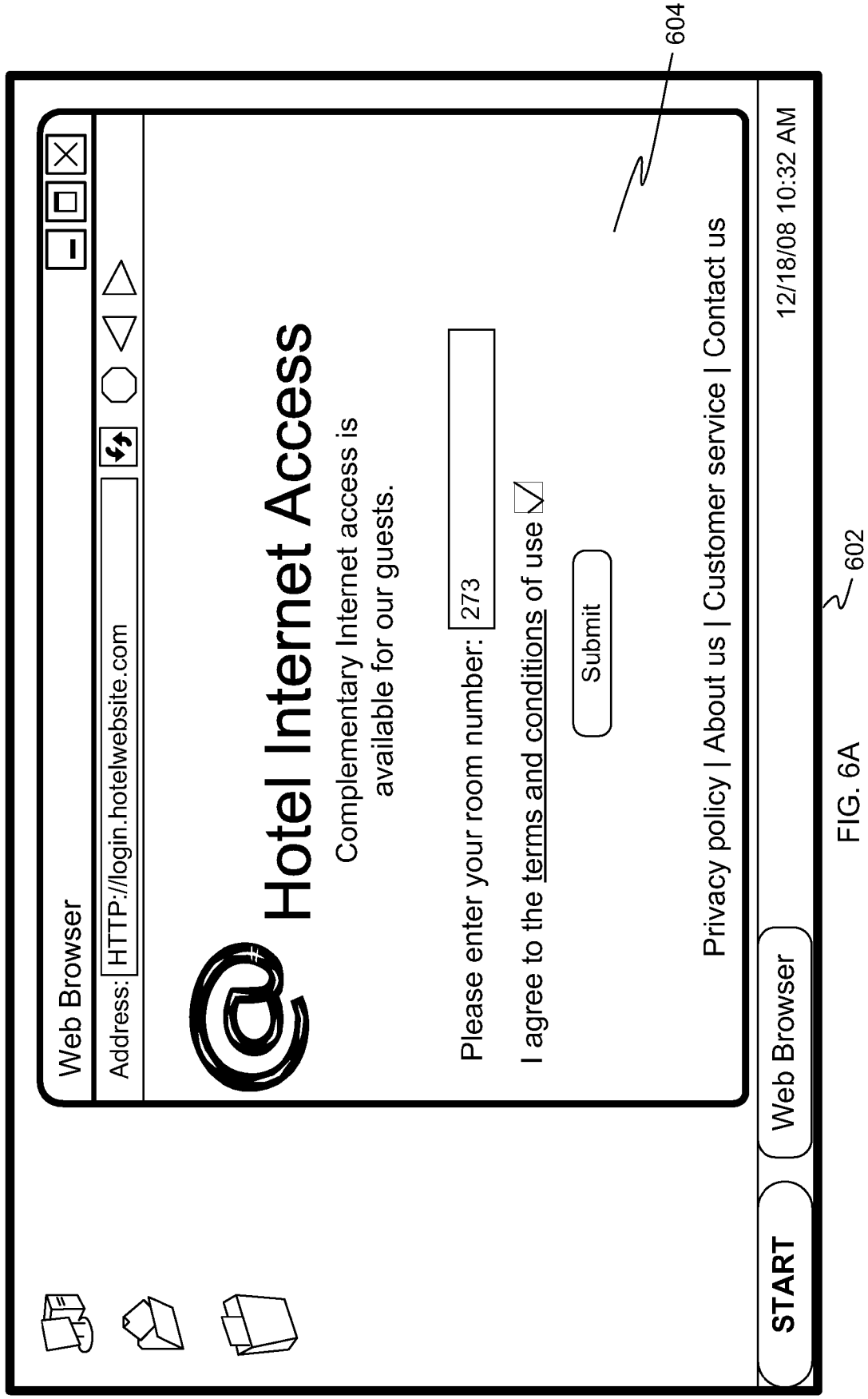
FIGS. 6A & B depict example displays for accepting conditions of network access.
Figure 6B:
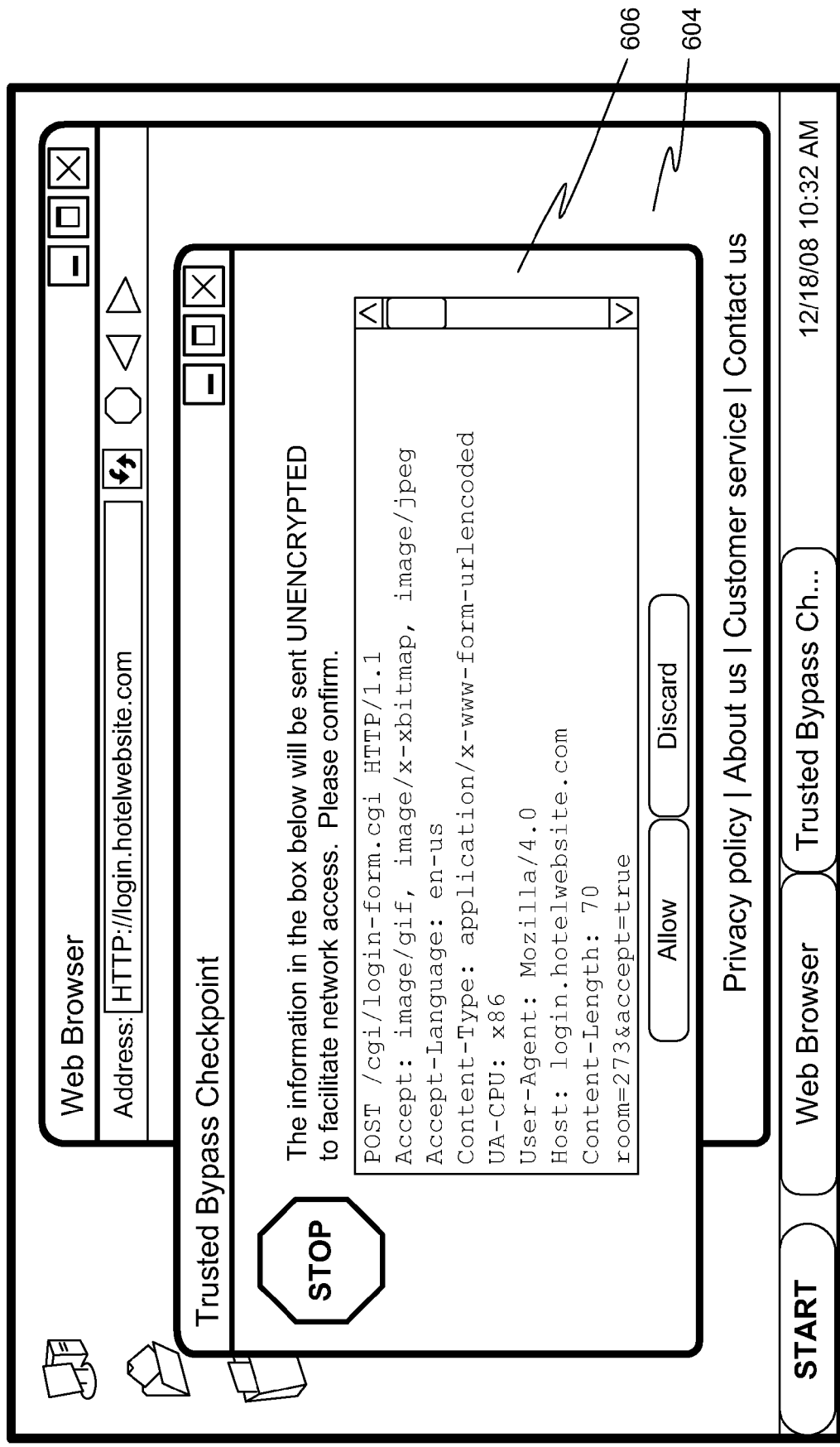

FIGS. 6A and 6B depict example displays for accepting conditions for network access. As shown in FIG. 6A, a user's computer display 602 may include a web browser window 604. The web browser window may display data that's indicative of a request to assent to conditions for network access. To illustrate, a user may be in room 273 of a hotel that offers complementary internet access. The hotel would like users to enter their room number as a method of non-intrusive authentication. The hotel would also like users to click a check box to agree to their terms and conditions of use. The terms and conditions of use may include legal language intended to release the hotel of liability that may arise from reliance on the hotel's complementary internet access.

The user may be in bypass mode. The user may enter the room number and click the check box. The user may click the submit button, which indicates to the browser that the data associated with presented page it to be sent back a hotel server.

The response may be intercepted and displayed to the user, as illustrated in FIG. 6B. The user's computer display 602 may include additional window pop-up window 606. The pop-up window 606 may include an indication of the user that the message has been intercepted. The pop-up window 606 may include instructions to the user that the information presented therein will be sent unencrypted (i.e., in the clear) and that the bypass feature is to be used to facilitate network access.

The pop-up window 606 may include human-readable text corresponding to the message being sent from the secure environment to the non-secure environment in unencrypted form. To illustrate, the pop-up window may include the body of the HTTP POST response in human-readable form. The POST response may include information that indicates the previously entered room number and/or the status of the checkbox, for example.

The user may inspect this data. If the user approves the data to be sent unencrypted, the user may click an approve button of the pop-up window. If the user disapproves, the user may click a discard button. Clicking the approve button may cause the data to be forwarded to a hotel server to facilitate network access for the user. Having provided the required information to the hotel server, the hotel sever may enable network access for the user. The user may proceed to establish secure communications over the hotel's access network.

What is claimed:
1. A device comprising:
a first port;
a second port;
a encryption module in communication with the first port and the second port, wherein the encryption module is configured to be operable in a first mode and in a second mode, wherein in the first mode the encryption module is configured to encrypt and send first data from the first port to the second port, and in the second mode the encryption module is configured to:
receive second data from the first port, and
prevent the second data from being sent unencrypted to the second port until an approval indication is received by a user interface of the device; and
the user interface configured to:
display information indicating that the second data is to be sent unencrypted to the second port prior to the second data being sent to the second port,
receive the approval indication, and
indicate to the encryption module that the approval indication has been received, wherein the encryption module is further configured to send the second data unencrypted to the second port based on the approval indication being received by the user interface.

2. The device of claim 1, wherein the encryption module is further configured to pass third data from the second port to the first port, the third data being indicative of a request for assent to conditions for network access and the second data being responsive to the third data.

3. The device of claim 2, wherein the encryption module is further configured to initiate a dummy hypertext transfer protocol session, and the second port is configured to receive the third data in response to the dummy hypertext transfer protocol session.

4. The device of claim 1, wherein the encryption module is further configured to enter the second mode responsive to an indication from the user interface.

5. The device of claim 1, wherein the user interface is configured to display the information indicating that the second data is to be sent unencrypted to the second port by displaying at least a portion of the second data in a human-readable format.

6. The device of claim 5, wherein displaying at least the portion of the second data in the human-readable format comprises one or more of displaying at least one of printable ASCII, UTF-8, or Unicode characters of the second data, applying line feeds and carriage returns to the second data, displaying printable hexadecimal-encoded characters of the second data as at least one of ASCII, UTF-8, or Unicode characters, or displaying non-printable hexadecimal-encoded characters of the second data as character names.

7. The device of claim 5, wherein displaying at least the portion of the second data in the human-readable format comprises displaying hidden data included in the second data.

8. The device of claim 5, wherein the user-interface is configured to display at least the portion of the second data in a pop-up window.

9. The device of claim 1, wherein encryption module is further configured to impose a time limit associated with continuous operation in the second mode.

10. The device of claim 1, wherein the encryption module is further configured to impose a message limit associated with operation in the second mode.

11. The device of claim 1, wherein the encryption module is further configured to store an indication of activity in the second mode in a security audit log.

12. The device of claim 1, wherein the encryption device is a Type 1 encryption device.

13. A device comprising:
a secure-side input;
a non-secure-side output;
an encryption module configured to operate in a bypass mode and a normal mode, wherein in the normal mode the encryption module is configured to encrypt data from the secure-side input and send the encrypted data to the non-secure-side output, and in the bypass mode the encryption module is configured to:
receive unencrypted data from the secure-side input, and
prevent the unencrypted data from being sent to the non-secure-side output until an approval indication is received by a user interface of the device; and the user interface configured to:
present at least a portion of the unencrypted data for approval, and
receive the approval indication, wherein in the bypass mode the encryption module is further configured to send the unencrypted data to the non-secure-side output based on the approval indication being received by the user interface.

14. The device of claim 13, wherein the encrypted data comprises data that is indicative of an assent to network conditions for a network in operable communication with the device via the non-secure-side output.

15. The device of claim 13, wherein in the normal mode the encryption module is further configured to in prohibit data that is not encrypted from being sent from the secure-side input to the non-secure-side output.

16. A device comprising;
an input;
an output;
an encryption module configured to operate in a bypass mode and a normal mode, wherein in the normal mode the encryption module is configured to encrypt data from the secure-side input and send the encrypted data to the non-secure-side output, and in the bypass mode the encryption module is configured to prevent unencrypted data received from the input from being sent to the output until an approval indication for the unencrypted data is received by a user interface of the device; and
the user interface configured to present a request for approval to send the unencrypted data to the output and receive the approval indication after presenting the request for approval, wherein in the bypass mode the encryption module is further configured to send the unencrypted data to the output based on the approval indication being received by the user interface.

17. The device of claim 16, wherein in the normal mode the encryption module is further configured to block data that is not encrypted from being sent to the output.

18. A non-transitory computer readable storage medium to provide a bypass mode in an encryption system, the non-transitory computer readable storage medium including computer executable instructions to perform a method, the method comprising:
operate an encryption module in a normal mode, wherein in the normal mode the encryption module encrypts data received from an input and sends the encrypted data to an output; and
operate the encryption module in a bypass mode, wherein the bypass mode:
the encryption module receives unencrypted data from the input,
the encryption module prevents the unencrypted data from being sent to the output until an approval indication is received by a user interface,
the user interface presents at least a portion of the unencrypted data for examination, and responsive to an indication received via the user interface that the unencrypted data is approved, the encryption module forwards the unencrypted data to the output.

19. The non-transitory computer readable medium of claim 18, wherein the method further comprises converting the unencrypted data into a human-readable format for presentation.

20. The non-transitory computer readable medium of claim 19, wherein converting the unencrypted data into the human-readable format for presentation comprises performing one or more of displaying printable one or more of ASCII, UTF-8, or Unicode characters of the unencrypted data, applying line feeds and carriage returns to the unencrypted data, displaying printable hexadecimal-encoded characters of the unencrypted data as one or more of ASCII, UTF-8, or Unicode, or displaying non-printable hexadecimal-encoded characters of the unencrypted data as character names.

21. The non-transitory computer readable medium of claim 18, wherein the method further comprises blocking data that is not encrypted from being sent to the output while in the normal mode.

* * * * *